United States Patent Office 3,400,135
Patented Sept. 3, 1968

3,400,135
OXETANE COMPOUNDS
Roger J. Polak, Mount Carmel, and John A. Wojtowicz, East Haven, Conn., and Joel A. Zaslowsky, Baltimore, Md., assignors to Olin Mathieson Chemical Corporation, a corporation of Virginia
No Drawing. Filed Sept. 28, 1964, Ser. No. 399,847
3 Claims. (Cl. 260—333)

ABSTRACT OF THE DISCLOSURE

Oxetanes are prepared in a two stage reaction in which in the first stage a halogen is reacted with an ethylenic alcohol and a monohydric alcohol to form an unsymmetrical ether. In the second stage the ether is dehydrohalogenated to yield oxetane compounds such as 3-methoxy oxetane, 3-ethoxy oxetane, 3-cyclohexoxy oxetane, 3-dodecoxyoxetane etc.

---

This invention relates to novel oxetanes and to a method for their preparation, more particularly this invention relates in a two-stage method in which in the first stage, a halogen is reacted with an ethylenic alcohol and a monohydric alcohol to form an unsymmetrical ether which has a halogen substituent as well as a hydroxy substituent on one of the groups attached to the ether oxygen atom. In the second stage, the unsymmetrical ether is dehydrohalogenated to yield an oxetane compound. This invention also relates to the novel unsymmetrical ether compositions formed in the first stage.

Any of the aliphatic ethylenic alcohols can be utilized to prepare the unsymmetrical ethers of this invention. An especially preferred class of starting ethylenic alcohols are the monoethylenic monohydric alcohols of the formula:

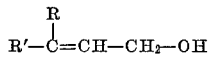

wherein R and R' are each selected from the group consisting of hydrogen and alkyl of from 1 to 5 carbon atoms, and wherein the total number of carbon atoms of R and R' is not more than 10. Typical examples of such alcohols are allyl alcohol, methallyl alcohol, crotyl alcohol, dimethyl crotyl alcohol, methyl vinyl carbinol, dimethyl vinyl carbinol, 3-methyl-2-buten-1-ol, methylisopropenyl carbinol, isoamylvinyl carbinol, etc. Examples of other suitable starting ethylenic alcohols include 3-buten-1-ol, 3-penten-1-ol, 3-methyl-3-butene-1-ol, 2-methyl-3-buten-1-ol, methylallyl carbinol, 4-methyl-4-penten-1-ol, methylethylaallyl carbinol, ethylallyl carbinol, 1-hepten-4-ol, methylethylallyl carbinol, dimethylallyl carbinol, 2,4-dimethyl-1-hepten-4-ol, 1-decen-4-ol, 3,7-dimethyl-2-octen-1-ol, etc. Cyclo aliphatic hydrocarbon alcohols such as 2-cyclohexenol; 3-cyclohexenol etc., can also be employed in the process of this invention.

Ethylenic alcohols which contain more than one hydroxyl group and/or more than one ethylenic double bond in the molecule can be used in this process. Polyhydric ethylenic alcohols which can be utilized are 1-butene-3,4-diol; 2-ethyl-1-phenyl-3-butene-1,2-diol; 1,2-dihydroxycyclohexene-3, etc. Polyethylenic alcohols as exemplified by vinyl allyl carbinol; allyl propenyl carbinol; diallyl methyl carbinol; geraniol; linalool, 2,4-cyclohexadienylmethanol; divinylbenzyl alcohol; and 3,4-dihydroxy-1,5-hexadiene are also useful starting materials.

Preparation of the unsymmetrical ethers

In the unsymmetrical ethers prepared by the method of this invention one of the groups attached to the ether oxygen atom corresponds to the monohydric alcohol minus the hydroxyl group while the second group is a halo hydroxy radical derived from the ethylenic alcohol.

Typical of the unsymmetrical ethers prepared by the method of this invention are those formed by reacting chlorine with allyl alcohol and methyl alcohol which have the following formula:

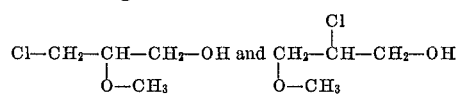

The overall reactions leading to products of the first stages of the method of this invention are represented in the following equations:

(A)
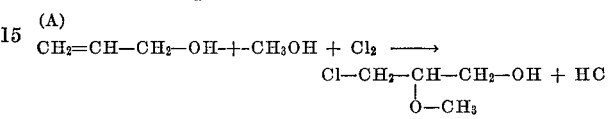

(B)
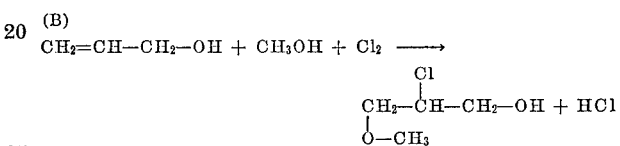

Although only those unsymmetrical ethers capable of forming an oxetane ring, such as the ether formed in Equation A, are useful in the second stage of the method of this invention, the novel unsymmetrical ethers of the type formed in Equation B are also a valuable class of materials which form a part of this invention.

Unsymmetrical ethers of this invention which form an especially useful class of compounds are those of the formula:

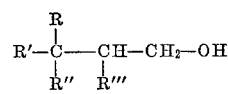

wherein R and R' are each selected from the group consisting of hydrogen and alkyl of from 1 to 5 carbon atoms, R" and R'" are each selected from the group consisting of chlorine, bromine, iodine, and the radical:

wherein R"" is selected from the group consisting of alkyl of from 1 to 20 carbon atoms and the radical:

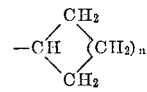

wherein $n$ is an integer of from 2 to 5 inclusive and with one of R" and R'" is the radical O—R"" and one of R" and R'" is selected from the group consisting of chlorine, bromine and iodine.

Generally, in this first stage reaction the reaction temperature will vary from about −70° C. to about +200° C. and preferably will be from about 0° C. to about +100° C. depending upon the particular reactants and reaction condition employed. One disadvantage of using reaction temperatures above 100° is that by-product formation becomes an appreciable problem. Likewise, the time of reaction will vary over a wide range and generally be from about 0.5 hour to about 15 hours or more depending on reaction conditions selected.

It has been found desirable to neutralize the hydrogen halide present in the reaction mixture at the conclusion of the first stage reaction in order to prevent or minimize the formation of by-products which reduce the yield of the desired unsymmetrical ether. Alkali metal hydroxides, such as sodium hydroxide, sodium carbonate, etc. can be utilized as neutralization agents.

Although the novel method of the first stage of this invention can be carried out conveniently at atmospheric pressure, the reaction can be conducted at pressures ranging from about 0.1 atmosphere to about 10 atmospheres or more.

The amount of halogen employed can be varied widely and generally will be from about 0.05 to about 1.0 mole per mole of the ethylenic alcohol utilized. Generally, from about 5 to about 100 moles of the monohydric alcohol will be employed per mole of the ethylenic alcohol utilized. The halogen can be added to the reaction mixture in liquid or gaseous form or as a solid when iodine is utilized. Various methods of addition of the halogen can be used including introducing the halogen in gaseous form through a sparger tube into the stirred ethylenic alcohol and monohydric alcohol or the chlorine and the ethylenic alcohol can be added simultaneously in approximately stoichiometric proportions to the monohydric alcohol. The unsymmetrical ether can be recovered from the reaction mixture by a variety of methods such as by extraction, distillation, etc. Either batch, intermittent of continuous method of reaction can be utilized in the formation of the unsymmetrical ether of this invention.

*Preparation of oxetane compounds*

Unsymmetrical ethers of the type formed in Equation A above (first stage reaction) are utilized to form valuable oxetane derivatives in the second stage of this invention.

The second stage reaction, or dehydrohalogenation stage, equation where, for purposes of illustration, the reaction of 2-methoxy-3-chloro-1-propanol with aqueous sodium hydroxide is shown:

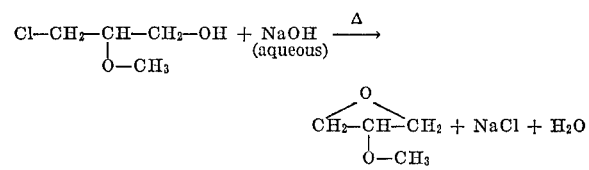

From about 1 to about 5 moles of the alkali metal hydroxide per mole of the unsymmetrical ether are employed in the dehydrohalogenation step. The strength of the alkali metal hydroxide solution utilized can be varied widely and generally will range from about 5 to 50 percent by weight based on the total weight of the solution and preferably, will be from about 20 to 45 percent by weight on the same basis. Sodium, potassium and lithium hydroxide can be utilized in this invention. Generally, the temperature at which the dehydrohalogenation reaction is conducted will vary from about 75° C. to about 150° C. and preferably will be from about 85° C. to about 120° C. It has been found convenient to carry out this reaction at reflux temperature. The time of reaction will vary from about 3 to about 24 hours or more depending upon the reaction conditions employed. Pressures varying from subatmospheric up to pressures of 10 atmospheres or more can be employed in the novel dehydrohalogenation reaction of this invention.

Any product in the aqueous layer which is present at the conclusion of the reaction can be recovered by extraction with a solvent, such as carbon tetrachloride, methylethyl ketone, etc. separated from the solvent by distillation and then added to the organic layer from which the oxetane product can be separated by distillation or by any other convenient method.

It is well known in the art that oxetanes can be polymerized to polymers of various molecular weights (see Farthing, J. Chem. Soc., November 1955, pages 3648–3654, and Rose, J. Chem. Soc., March 1956, pages 542–555). Such polymers exhibit outstanding hydrolytic and thermal stability. The oxetane compounds of this invention can be copolymerized with tetrahydrofuran to yield millable polyalkyleneether copolymers having molecular weights of at least 25,000. For example, 3-methoxyoxetane can be polymerized with 60 mole percent of tetrahydrofuran in the presence of phosphorus pentafluoride catalyst to give an elastomeric copolymer which can be cured by heating at 100° C.–175° C. and in the presence of dicumyl peroxide to yield a copolymer having good thermal and hydrolytic stability.

The liquid unsymmetrical ethers formed in the first stage of the method of this invention are useful in surface coating compositions as solvents for resins.

The following examples illustrate various embodiments of this invention and are to be considered not limitative.

Example I.—Preparation of 2-methoxy-3-chloro-1-propanol (A)

Methanol (14 moles) was placed in a three-necked, 5 l. flask equipped with a stirrer, dropping funnel and fritted disc inlet at the bottom of the flask. Platinum and calomel electrodes were suspended in the methanol and connected to a millivolt recording pH meter. Allyl alcohol (25 g.) was then added to the methanol followed by the simultaneous addition of allyl alcohol and chlorine in approximately stoichiometric proportions. The rate of addition of the chlorine was 2 g./minute. A total of 5 moles of alcohol was added. Chlorine addition was continued until a sharp break in the millivolt potential occurred (5.05 moles of chlorine added).

The product mixture was analyzed by vapor phase chromatographic methods (VPC). It was determined that the yield of 3-methoxy-2-chloro-1-propanol was 23.4 percent (1.17 moles), the yield of 2-methoxy-3-chloro-1-propanol was 60.3 percent (3.02 moles) and there was no glycerol dichlorohydrin found. The conversion of allyl alcohol was 90 percent.

Preparation of 3-methoxyoxetane (B)

Excess methanol was removed from the reaction mixture of Part A of this example under atmospheric pressure. The crude product (622 g.) was added to 2 l. of 10 percent sodium hydroxide solution and stirred at 25° C. for two hours and finally at 105° C. for two additional hours. VPC analysis indicated complete conversion of the 2-methoxy-3-chloro-1-propanol. The mixture was extracted twice with 2 l. portions of methyl ethyl ketone and the extracts, after being combined, were analyzed by VPC and found to contain 1.18 moles of 3-methoxyoxetane.

The ketone was stripped under atmospheric pressure in a 12″ glass helices, packed column until a flask temperature of 100° C. was attained. There was obtained, after distillation of the crude product under 50 mm. Hg pressure through 24 inch packed column with automatic reflux control, 93 g. (1.06 mole) of 3-methoxyoxetane, B.P. 43° C. at 50 mm. Hg.

The 3-allyloxyoxetane was analyzed for carbon and hydrogen and the following results were obtained:

Calc'd for $C_4H_8O_2$: C, 63.4; H, 8.9. Found: C, 63.2; H, 8.8.

Example II.—Preparation of 2-ethoxy-3-chloro-1-propanol (A)

In this example 5.05 moles of chlorine was reacted with 5.0 moles of allyl alcohol and 51.0 moles of ethanol in the same manner and in the same apparatus employed in Example I (A). Chromatographic analysis (VPC) indicated that there had been formed 1.17 moles of glycerol dichlorohydrin which corresponds to a yield of 23.4 percent; 0.80 mole of 3-ethoxy-2-chloro-1-propanol which corresponds to a yield of 16.0 percent and 1.66 moles of 2-ethoxy-3-chloro-1-propanol which corresponds to a yield of 33.2 percent.

Preparation of 3-ethoxyoxedane (B)

The reaction product prepared in (A) above was stripped to remove ethanol and the resulting crude product was dehydrohalogenated by heating in the presence of 2 l. of 10 percent sodium hydroxide solution for 4 hours at 100° C. The extracts obtained by extracting the resulting mixture with two 1 l. portions of methylethyl ketone were combined and, in order to remove the ketone, the mixture was distilled under atmospheric in a 12 inch glass helices, packed column until a flask temperature of 100° C. was attained. Finally, the concentrated crude was distilled under 25 mm. Hg pressure through a 24 inch packed column equipped with an automatic reflux control to yield 104 g. (1.02 moles) of 3-ethoxyoxetane, B.P. 43 at 25 mm. Hg.

The 3-ethoxyoxetane was analyzed for carbon and hydrogen and the following results were obtained:

Calc'd for $C_5H_{10}O_2$: C, 58.8; H, 10.3. Found: C, 58.1; H, 10.5.

Example III.—Preparation of 2-cyclohexoxy-3-chloropropanol (A)

Cyclohexanol (5.3 moles) and allyl alcohol (1 mole) were placed in a 1 liter, three-necked flask which was equipped with a stirrer, a dropping funnel and fritted disc inlet at the bottom. Chlorine was added at a rate of 1 g. per minute until 1.02 moles had been introduced.

Preparation of 2-cyclohexoxy-3-chloro-1-propanol (A)

Allyl alcohol (1 mole) and chlorine (1.02 moles) were added simultaneously in approximately stoichiometric proportions to 5.4 moles of cyclohexanol. The rate of chlorine addition was 1 g. per minute. The same apparatus utilized in (A) above was employed. Analysis of the reaction mixtures of (A) and ($A_1$) by VPC indicated very little difference in product distribution. The products were combined and analyzed by VPC. The analysis indicated that 0.62 mole of glycerol dichlorohydrin (38 percent yield) and 0.44 mole of 2-cyclohexoxy-3-chloro-1-propanol (27 percent yield) had been formed.

Preparation of 3-cyclohexoxyoxetane (B)

The combined crude reaction products from (A) and ($A_1$) above were stripped under 100 mm. Hg pressure to remove unreacted cyclohexanol and allyl alcohol. The concentrated product (160 g.) was added to 300 ml. of 10 percent sodium hydroxide solution and refluxed for 25 hours, adding additional 10 g. increments of sodium hydroxide after 4, 14 and 20 hours. The resulting mixture was cooled and two layers separated. The organic layer (130 g.) was removed and analyzed by chromatographic analysis (VPC) which indicated that 0.23 mole 3-cyclohexoxyoxetane (60 percent yield) had been formed. This corresponds to a conversion of 87 percent of 2-cyclohexoxy-3-chloro-1-propanol. The crude product was distilled at 9 mm. Hg through a 12 inch ceramic packed column with automatic reflux control and there was obtained 24.5 g. of product (B.P. 93° C. at 9 mm. Hg) which was identified by infrared analysis as 3-cyclohexoxyoxetane.

Example IV.—Preparation of 2-dodecoxy-3-chloropropanol (A)

To 547 g. (2.5 moles) of dodecanol in a liter, three-necked flask which was equipped with a stirrer, dropping funnel and a dip tube for chlorine addition there was added simultaneously and in approximately stoichiometric proportions 1.0 mole of allyl alcohol and 1.02 moles of chlorine with the latter being added at the rate of 1 g. per minute.

The crude reaction was analyzed by chromatographic analysis (VPC) and it was found to contain glycerol dichlorohydrin in an amount estimated to correspond to a yield of between 40-50 percent and 2-dodecoxy-3-chloro-1-propanol in an amount which was estimated to correspond to a yield of 25-35 percent.

Preparation of 3-dodecoxyoxetene (B)

Excess dodecanol was stripped off from the reaction product prepared in (A) above under 6 mm. Hg. The stripped crude (106 g.) was added to 200 ml. of 20 percent sodium hydroxide solution and the resulting mixture refluxed for twenty-hours. At the end of the reflux period a two-phase system was present. The organic layer was separated and distilled under 0.2 mm. Hg through a 6 inch Vigreau column and a 20 g. fraction boiling between 80° and 130° C. was recovered. A pure sample of 3-dodecoxyoxetane was separated from the crude product in a chromatographic column and the identity of this product was confirmed by infrared analysis. The yield of 3-dodecoxyoxetane was estimated to be 50–60 percent based on the amount recovered in the chromatographic column.

Example V.—Preparation of 2-butoxy-3-chloro-1-propanol

Normal butyl alcohol (100.5 lbs.) was charged to a 72 l. glass reactor equipped with a glass cooling coil, a chlorine sparger and an air driven stirrer. Over a period of 200 minutes 15.8 lbs. of allyl alcohol in nine equal increments. Simultaneously and continuously 19.3 lbs. of chlorine was added to the reactor. The allyl alcohol was added in a manner so that some unreacted allyl alcohol was present at all times. During the reaction, cooling was employed in order to maintain the temperature between 34°–51° C.

The dissolved hydrogen chloride present in the reaction mixture was neutralized with 13.9 lbs. of 50 percent sodium hydroxide diluted with an equal volume of water. During the addition of the sodium hydroxide a temperature of less than 40° C. was maintained by cooling. After allowing the reaction mass to stratify, the upper or organic layer was transferred to a 72 l. glass stripping vessel fitted with a stirrer, thermowell, and take-off condenser. In order to remove the bulk of the excess butyl alcohol the organic layer was distilled until a pot temperature of 136° C. was attained. The residue, containing the 2-butoxy-3-chloro-1-propanol, was removed from the reactor and drummed.

Preparation of 2-butoxyoxetane

The same reactor employed in the stripping step in (A) above was cleaned and a reflux condenser was connected to it. Two gallons of 50 percent sodium hydroxide and two gallons of water were added following which the contents were heated to 69° C. Then the 41.5 lbs. of residue (from (B) above) containing the 2 - butoxy - 3-chloro-1-propanol was added to the reactor over a period of 63 minutes. At the end of 0.4 hour the temperature had reached reflux temperature (107°–110° C.) which was maintained for an additional period of 19.6 hours. Periodically samples were withdrawn and the course of the reaction was followed by vapor phase chromatographic (VPC) analysis. The upper oil phase, which separated on cooling, was then removed (weight—28.5 lbs.). Fractionation of this phase gave 2.33 lbs. 3-butoxyoxetane, B.P. 76° C. at 25 mm. Hg. Infrared analysis of this product gave the characteristic adsorption bands of the alkoxyoxetanes.

The 3-butoxyoxetane was analyzed for carbon and hydrogen and the following results were obtained:

Calc'd for $C_7H_{14}O_2$: C, 64.6; H, 10.77. Found: C, 64.8; H, 10.76.

Monohydric alcohols of the formula:

wherein R'''' is selected from the group consisting of alkyl of from 1 to 20 carbon atoms and the radical:

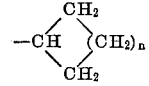

wherein $n$ is an integer of from 2 to 5 inclusive are suitable starting materials for the process of this invention. Useful monohydric alcohols include methyl alcohol, n- propyl alcohol, isopropyl alcohol, n-butyl alcohol, n-amyl alcohol, isohexyl alcohol, n-octyl alcohol, isododecyl alcohol, n-tetradecyl alcohol, isooctadecyl alcohol, cyclopentanol, cyclohexanol, cyclooctanol, etc.

What is claimed is:

1.

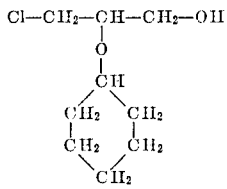

2.

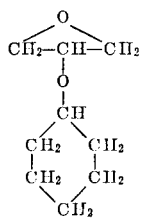

3. An oxetane of the formula:

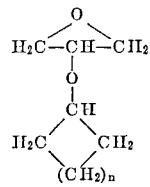

wherein $n$ is an integer of from 2 to 5 inclusive.

References Cited

UNITED STATES PATENTS

| | | | |
|---|---|---|---|
| 2,070,990 | 2/1937 | Groll et al. | 260—348.6 |
| 2,237,284 | 4/1941 | Alquist et al. | 260—348.6 |
| 2,965,652 | 12/1960 | Van R. Gaertner. | |
| 3,093,689 | 6/1963 | Cofer et al. | 260—613 |
| 3,156,701 | 11/1964 | Rocklin | 260—333 |

FOREIGN PATENTS 635,428 11/1963 Belgium.

OTHER REFERENCES

Jackson: Jour. Am. Chem. Soc., vol. 48 (1926), pp. 2166–74.

NORMA S. MILESTONE, *Primary Examiner.*